Jan. 24, 1961 J. J. LYNOTT 2,969,435

OIL FILM SPACER FOR MAGNETIC RECORDING DEVICE

Filed Feb. 7, 1955

INVENTOR:
JOHN J. LYNOTT

BY Hansen and Lane

ATTORNEYS

United States Patent Office 2,969,435
Patented Jan. 24, 1961

2,969,435

OIL FILM SPACER FOR MAGNETIC RECORDING DEVICE

John J. Lynott, Los Gatos, Calif., assignor to International Business Machines Corporation, New York, N.Y., a corporation of New York Filed Feb. 7, 1955, Ser. No. 486,418

1 Claim. (Cl. 179—100.2)

The present invention relates to magnetic recording devices and more particularly to a fluid bearing and means for applying the same between a magnetic recording head and a recording surface for maintaining them in predetermined spaced relation.

So far as this invention is concerned, the mechanics of the recording device is well known in that it embodies any conventional transducer in a recording head yieldably urged toward a recording surface upon which impulses transmitted from the transducer are stored.

In conjunction with such an arrangement, it will be apparent that considerable wear on either of the contacting surfaces of such devices can occur. Moreover, such wear tends to effect a scratching of the recording surface resulting in faulty pick-up of the transmitted signal as well as obscuring and even obliteration of a transmitted signal.

While present manufacturing practices make it possible to construct magnetic recording devices with such precision that a fixed spacing between the recording head and recording surface may be afforded, such precision machining would be prohibitive in cost and therefore render the ultimate product unmarketable. Moreover, any tolerance for wear and/or defects in construction would necessarily create the very problem here sought to be alleviated.

It is therefore one object of this invention to provide a simple yet effective means for maintaining a predetermined uniform spacing between the recording head and recording surface. With this object in mind it should be understood that since it is practically impossible to provide a recording surface which is absolutely true of surface, the present invention is particularly effective in connection with recording surfaces in which surface runoff may well occur.

Accordingly it is another object of this invention to provide a recording head with facilities for laying down upon the recording surface a film of lubricant in advance of the point of registry of the recording face thereof with the recording head.

It is a further object of this invention to provide a sled-type recording head provided with a nozzle for discharging lubricant upon that portion of the recording surface advancing relatively into register with the recording head.

Yet another object of this invention is to provide means by which a physical body of non-insulating material is interjected between the related surfaces of a transducer and a magnetic recording disc or drum for maintaining them in spaced albeit message transmitting relation during their relative movement with respect to each other.

These and other objects and advantages of the present invention will become apparent in the following description and the accompanying drawings in which.

Figures 1, 2, 3:
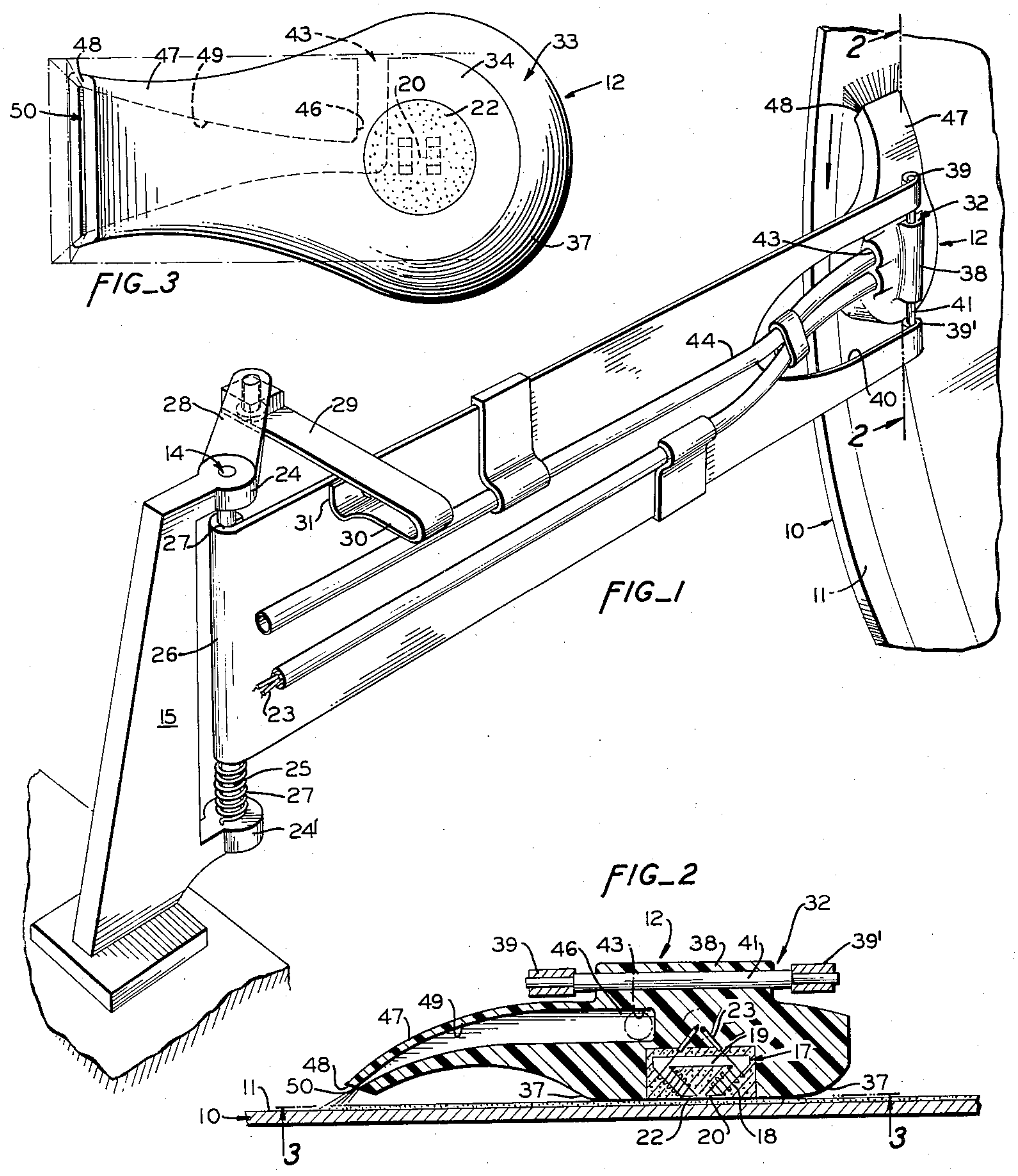
Fig. 1 is a fragmentary perspective view of a portion of a magnetic recording device embodying the present invention.
Fig. 2 is an enlarged longitudinal section through the recording head and recording surface shown in Fig. 1 and taken along line 2—2 therein.
Fig. 3 is a bottom plan view of the recording head shown in Fig. 2 and as seen from line 3—3 therein.

In Fig. 1 the invention is shown embodied in an arrangement which generally comprises a movable member 10 having a recording surface 11 toward which a recording head 12 is pressed. More specifically the recording head 12 is supported on the free end of an arm 13 the opposite end of which is pivotally mounted as at 14 on a fixed bracket 15 for swinging movement about an axis which is parallel to the recording surface 11 of the movable member.

So far as the recording principle is concerned, it may be of any well known design involving a magnetic transducer 17 embedded in or carried by the recording head 12. The transducer 17 exemplified in the present disclosure includes windings 18 and a core 19 having a read-write gap 20 on one face 21 thereof disposed parallel and adjacent to the bottom face 22 of the transducer 17. The windings 18 of the transducer are connected by parallel wires 23 extending from the recording head back along the arm 13 for operative connection to any suitable electronic mechanism (not shown).

The fixed bracket 15 preferably includes a pair of ears 24—24' between which a pintle shaft 25 is supported. This pintle 25 extends through a sleeve 26 formed on the end of the arm 13 to complete the pivotal mounting 14 hereinbefore more generally mentioned. A helical spring 27 circumscribes the lower portion of the pintle 25 between the sleeve 26 and the lower ear 24' of the bracket 15. The spring 27 has one of its ends anchored in the ear 24' and its opposite end engaged against the arm 13 in a manner to normally urge the latter (clockwise Fig. 1) in a direction away from the movable member 10.

The uppermost ear 24 of the bracket 15 has an extension 28 forming a fixed base for one end of a spring steel clip 29 extending across the upper edge of the arm 13. The end portion 30 of the clip 29 is bent back under itself and provided with a yieldable abutting end 31 adapted to engage the arm 13 for maintaining the latter in a position in which the recording head 12 will be pressed against the recording surface 11. The clip 29 being of spring steel need only be flexed upwardly to release the arm 13 for swinging movement away from the recording surface 11. Note that the end portion 30 of the spring clip 29 is in the form of a cam so that when the arm 13 is pressed by hand (counter-clockwise Fig. 1) toward the plane of the recording surface 11, the upper edge of arm 13 flexes the spring clip 29 upwardly until the abutting end 31 of the clip is passed and again engages the back face of the arm 13 to maintain it in operative position.

It should here be noted that the recording surface 11, although appearing on a disc type movable member in Fig. 1, may well be provided on a drum, a tape or any other form of movable member capable of presenting a recording surface to the signal receiving or transmitting face 22 of the transducer 17.

The recording head 12 as previously explained is supported at the free end of the arm 13. For purposes of the present invention, a pivotal connection 32 is provided between the arm 13 and recording head 12 to afford rocking of the latter about an axis parallel to the same to accommodate for surface run-out in a direction transverse to the direction of movement of the movable member 10.

In accordance with the present invention, the recording head 12 comprises a body 33 of non-conductive material preferably, although not necessarily, molded around the magnetic transducer 17 previously described. In this connection see for example Fig. 2 in which the body 33 has a bottom surface 34 disposed in the same plane as the bottom surface 22 of the tranducer 17 and encompassing the latter. This bottom surface 34 of the body 33 serves as a runner for the sled-type recording head in that it is disposed for normal surface contact with the recording face 11 of the movable member 10 and would ordinarily gide over the same.

For purposes of the present invention the body 33 of the recording head 12 will be considered as having its longitudinal axis disposed congruent to the path of movement of the recording surface 11, although in the disclosure of Fig. 1 herein it would be more correctly said to be tangentially disposed with respect thereto. In order to afford a clear understanding of the orientation of the recording head 12 relative to the movable member 10, that end of the body 33 which faces the oncoming recording surface 11 of the movable member 10 will be referred to as the fore end 35 of the sled-type recording head 12. The opposite end 36 of the body 33 will accordingly be referred to as the trailing end of the recording head 12.

Referring again to Figs. 2 and 3, it will be noted that the perimeter of the body 33 adjacent the bottom face 34 thereof is in the form of a convex or rounded bead 37 so that a gliding action would occur between the recording surface and the bottom or runner surface of the sled-like recording head 12. The upper or outer side of the body 33, i.e., that face thereof opposite to the bottom 34, has a boss 38 formed thereon extending from fore to aft end of the body 33. This boss 38 fits between the bossed ends 39—39' of a yoked end 40 of the arm 13 for pivotal connection with the latter by means of a pin 41.

The back or outer face of the body 33 is also provided with two inlet openings facing in the direction of the arm 13. The aft one of these openings 42 is for the parallel wires 23 connected to the windings 18 about the core 19 of the transducer 17, see also Fig. 2. The fore one of the openings 43 is an inlet port adapted to have sealed connection with one end of a conduit or flexible tube 44 which extends along the arm 13 and beyond the pivotal mounting 14 of the latter for connection to a source 45 of lubricating oil O.

Figure 4:
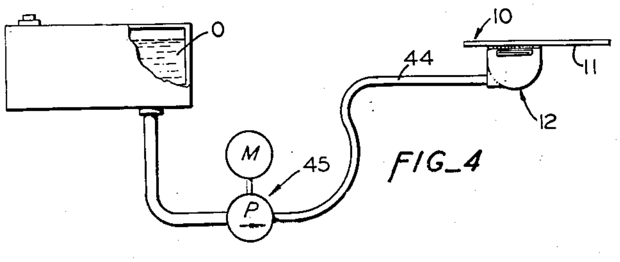
Fig. 4 is a schematic diagram of a fluid pressure system associated with the recording head as contemplated by the present invention.

In connection with the foregoing, reference is made to Fig. 4 schematically showing a compressor 45 for supplying the oil O under a predetermined pressure to the receiving end of the flexible hose or tube 44. The opposite end of this tube 44 discharges the oil or lubricant under pressure into the body 33 via the inlet port 43 which communicates with the manifold end 46 of a nozzle 47 preferably formed integrally with the main body 33 of the recording head 12.

The nozzle 47 extends forwardly from the main body 33 and is fish-tail like in appearance in that it flares sidewise while tapering down to a flat fin curving toward the recording surface 11 of the movable member 10. The terminal end 48 of the fish-tail like nozzle 47 is spaced slightly outwardly from the plane of the bottom or runner face 34 of the body 33. In this manner the terminal end 48 of the nozzle will be spaced from the recording surface 11.

It will be noted in Fig. 2 that the fish-tail like fin type nozzle has an internal passage 49 emanating from the manifold portion 46 of the nozzle. As illustrated in Fig. 3, this passage 49 flares sidewise while narrowing down in a transverse direction so as to terminate at the terminal end 48 of the fin in a discharge slit 50 extending transverse to the fore to aft axis of the main body 33. In other words, the spread on the discharge slit 50 is such as to embrace or overlie that portion of the recording surface 11 which is about to be covered by or registered with the bottom face 34 of the body 33 encompassing the lower face 22 of the transducer 17.

As is depicted in Fig. 2, the terminal end 48 of the nozzle 47 is preferably angularly disposed from an aft to fore direction relative to the recording surface 11 in a manner to spray the pressurized oil or lubricant O in a mist-like or atomized condition upon the recording surface 11 as the latter is about to move in under the nozzle 47. It will thus be seen that while the movable member 10 turns in the direction of the arrow *a* (Fig. 1) a film of oil O is laid down upon the recording surface 11 just prior to registry thereof with the bottom face 34 of the recording head 12. In this manner actual frictional contact between these two surfaces is eliminated because the recording head 12 will in effect ride upon this thin film of oil O.

From the foregoing it will be appreciated that the film of oil O provides a physical bearing between the recording surface 11 and the bottom face 34 of the recording head. This physical bearing more importantly acts as a spacer between these two surfaces 11 and 34 which would otherwise be in actual physical contact with each other.

In connection with the foregoing, the arrangement shown in the drawings of the present disclosure is calculated to provide an oil film spacer for spacing the two surfaces 11 and 34 of the relatively moving members approximately .002 inch from each other. This is controlled by the tolerances in the construction of the arm 13 and the spring clip 29 by which the arm is urged toward the recording surface. In other words a minute spacing without any physical contact is obtained. This spacing is relatively uniform at all times due to the viscosity of the oil being used in contrast with the force exerted upon the arm 13 by the spring clip 29. Obviously the viscosity of the oil can be changed to vary the gap between the two surfaces 11 and 34 should a greater or lesser spacing thereof be desired.

While the nozzle 47 by which the oil film is supplied to the recording surface is specifically shown as a part of the recording head, it should be apparent to those skilled in the art that the nozzle may well be detached therefrom. Moreover, while in the present disclosure the oil film is laid down just ahead of the sled-like recording head the film may be spread upon the rotating disc from its center to its periphery by centrifugal force should such manner of distribution be deemed feasible.

While the foregoing description has been in specific detail it will be appreciated that it is susceptible to variation, alteration and/or modification without departing from the spirit of the invention. I therefore desire to avail myself of all variations, alterations and/or modifications as fairly come within the purview of the appended claim.

What I claim as new and desire to protect by Letters Patent is:

In combination with a magnetic record surface of known formation and mounted to move in a known direction, a head element having a bearing surface thereon shaped to conform to the record surface, means for mounting said head element with its bearing surface in close, conforming relation with said record surface, a transducer flush-mounted in said bearing surface, means for urging the head element toward full, bearing contact with said record surface, an elongated neck extending forwardly from the head element, a duct leading to a forward portion of the neck, a discharge nozzle at the forward end of said duct, means for conveying a lubricating liquid into and through said duct and said nozzle and thence onto the record surface ahead of the bearing surface in the direction of record travel, for providing a liquid lubricant coating on the record surface, whereby said bearing surface rides on such coating to thereby uniformly space said bearing surface, and the transducer mounted therein, from said record surface against the pressure of said urging means by a minute distance controlled by the viscosity of the lubricant liquid.

References Cited in the file of this patent

UNITED STATES PATENTS

| | | |
|---|---|---|
| 1,630,713 | Meyer | May 31, 1927 |
| 1,887,021 | Henderson | Nov. 8, 1932 |
| 1,990,548 | Keller | Feb. 12, 1935 |
| 2,426,838 | Miller | Sept. 2, 1947 |
| 2,612,566 | Anderson | Sept. 30, 1952 |
| 2,629,605 | Krisch | Feb. 24, 1953 |
| 2,656,420 | Isberg | Oct.20, 1953 |
| 2,736,106 | Offen | Feb. 28, 1956 |
| 2,772,135 | Hollabaugh et al. | Nov. 27, 1956 |
| 2,787,750 | Jones | Apr. 2, 1957 |